No. 824,624. PATENTED JUNE 26, 1906.
J. H., R. M. & C. E. CHAMBERS.
CHANGE SPEED AND REVERSING GEAR FOR AUTOMOBILES.
APPLICATION FILED MAY 10, 1905.
3 SHEETS—SHEET 1.
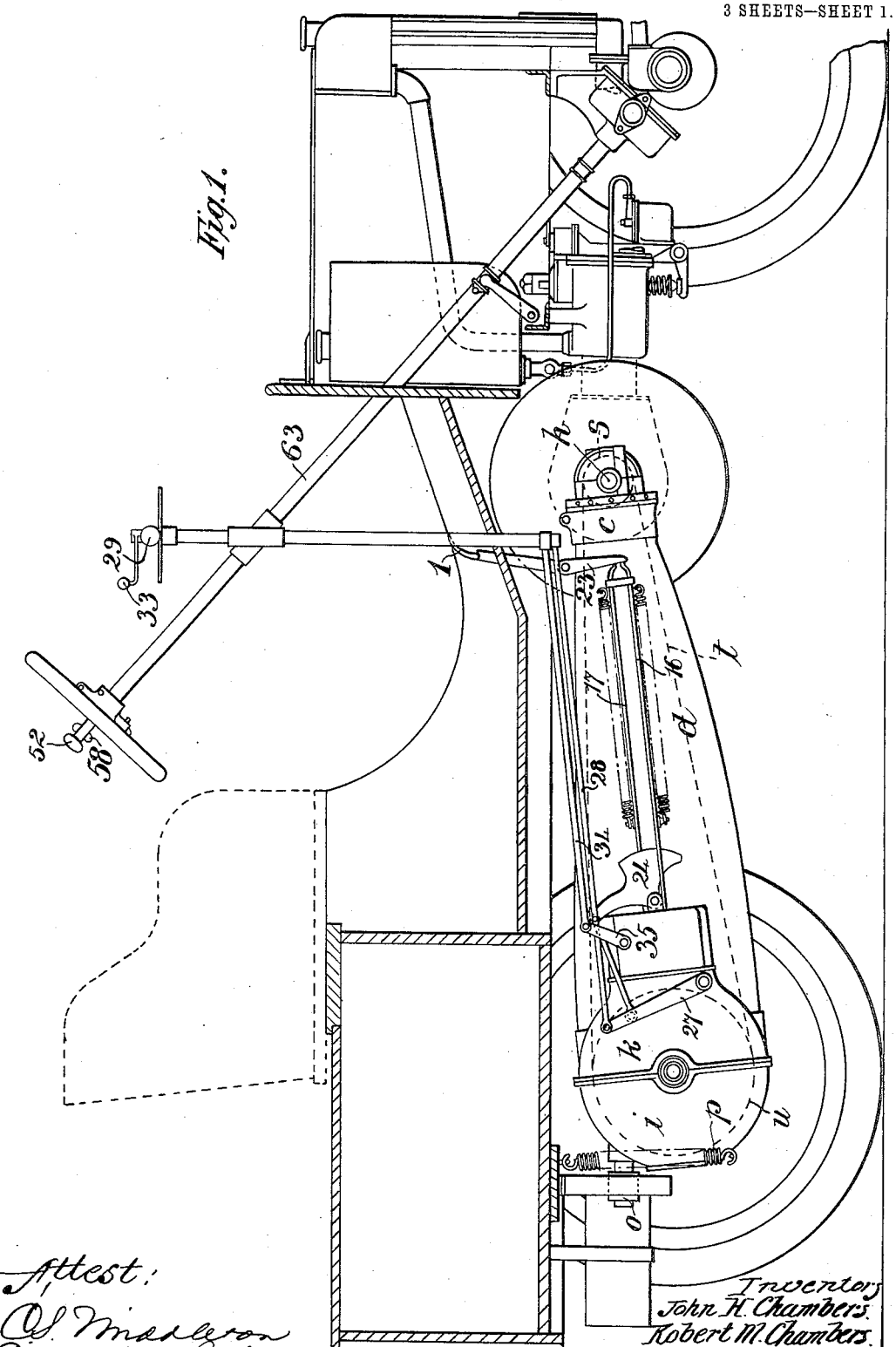

No. 824,624. PATENTED JUNE 26, 1906.
J. H., R. M. & C. E. CHAMBERS.
CHANGE SPEED AND REVERSING GEAR FOR AUTOMOBILES.
APPLICATION FILED MAY 10, 1905.
3 SHEETS—SHEET 2.
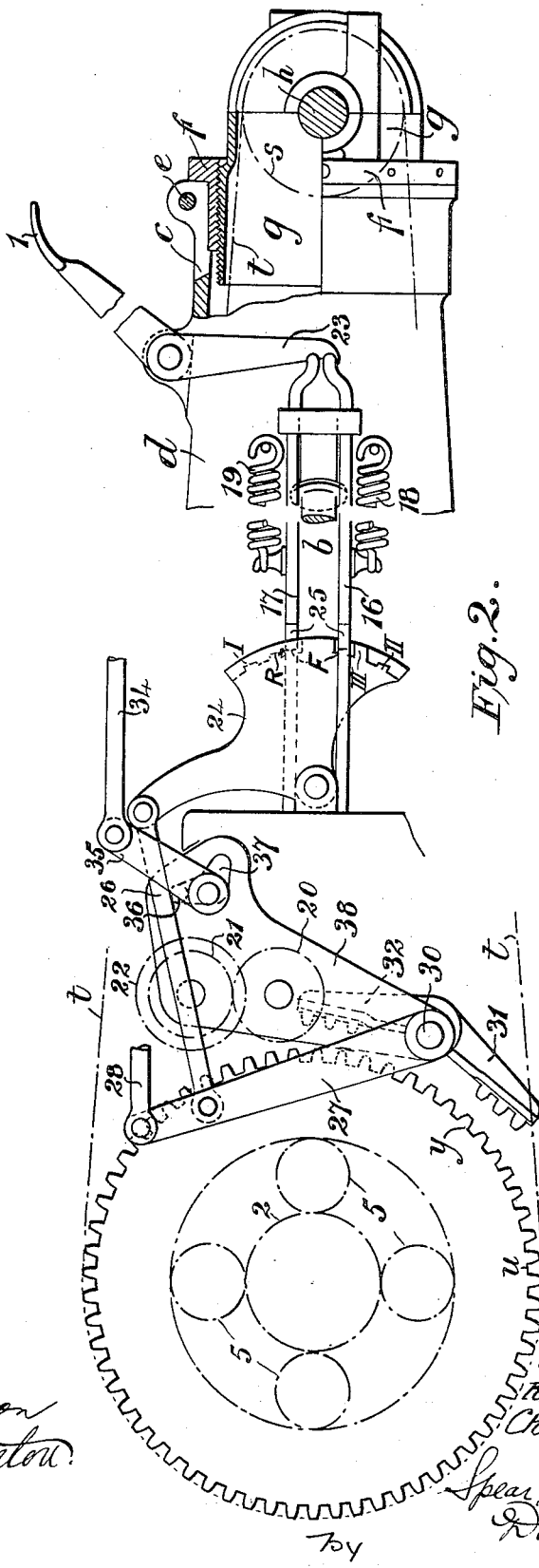

No. 824,624. PATENTED JUNE 26, 1906.
J. H., R. M. & C. E. CHAMBERS.
CHANGE SPEED AND REVERSING GEAR FOR AUTOMOBILES.
APPLICATION FILED MAY 10, 1905.
3 SHEETS—SHEET 3.
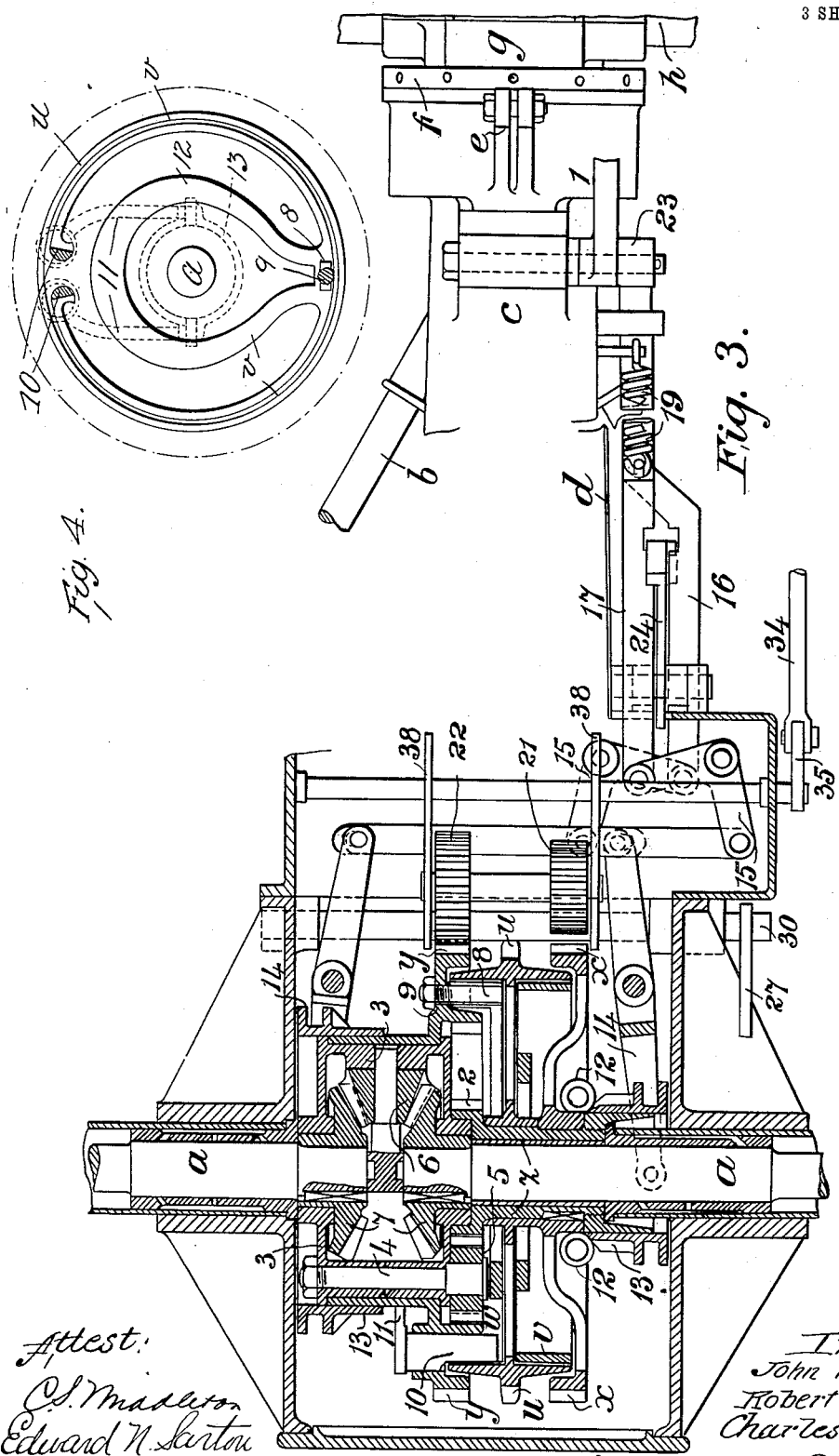

UNITED STATES PATENT OFFICE.

JOHN HENRY CHAMBERS, OF LONDON, ENGLAND, AND ROBERT MARTIN CHAMBERS AND CHARLES EDWARD CHAMBERS, OF BELFAST, IRELAND.

CHANGE-SPEED AND REVERSING GEAR FOR AUTOMOBILES.

No. 824,624.     Specification of Letters Patent.     Patented June 26, 1906.

Application filed May 10, 1905. Serial No. 259,825.

*To all whom it may concern:*

Be it known that we, JOHN HENRY CHAMBERS, residing at 31 Acre Lane, Brixton, London, England, and ROBERT MARTIN CHAMBERS and CHARLES EDWARD CHAMBERS, residing at Cuba street, Belfast, Ireland, subjects of the King of Great Britain and Ireland, have invented certain new and useful Improvements in Change-Speed and Reversing Gear for Automobiles, of which the following is a specification.

This invention relates to change-speed and reversing gear for automobiles, the object being to provide a compact and efficient form of gear by which a driver can obtain a number of changes in speed and a reverse by depressing a pedal and then moving two light handles or pointers over an indicating-plate, the depression of the pedal disengaging the gear and the movement of the handles setting it for reëngagement or release of the pedal, so that the manipulation requires no special or complex training or skill on the part of the driver, and thereby lessens liability to accident due to irregular manipulation in case of excitement or flurry.

The invention is illustrated by the accompanying drawings, in which—

Figure 1 is a sectional elevation of an automobile with the gear applied thereto. Figs. 2 and 3, respectively, show the gear in side elevation and plan, partly in section. Fig. 4 is a detail of a clutch employed.

In carrying out the invention power from the crank-shaft $h$ is transmitted to the change-speed gear by a sprocket-pinion $s$ and a chain $t$, the latter continuously driving the wheel $u$ on the change-speed gear. The change-speed gear comprises the sprocket-wheel $u$, having internal clutch-surfaces into which expanding rings $v$ and $w$ are adapted to engage, the rings being carried by spur-wheels $x$ and $y$, respectively. The sprocket is a loose wheel. The spur-wheel $x$ is keyed on a sleeve $z$, which is loose on the axle $a$, and has a sun-pinion 2 mounted on or formed in one with it. The spur-wheel $y$ is freely mounted. It has two sets of teeth, one external set and one internal set. (See Fig. 3.) It also has an extension which is freely mounted on the differential box 3. The box 3 is freely mounted and carries on a pin or pins 4 one or a number of planet-pinions 5, which engage with the internal teeth of the wheel $y$ and with the sun-pinion 2. The box 3 also carries the planet-pinion 6 or pinions of the usual balance-gear comprising the pinion 6 and sun-pinions 7 7 on the two parts of the axle $a$.

In the example illustrated in Figs. 2 and 3 the gear is designed for three speeds ahead, one reverse, and a neutral or "free-wheel" condition. The first or slowest speed ahead is obtained by throwing in the clutch $v$ and locking the wheel $y$, the second by throwing in the clutch $w$ and locking the wheel $x$, the clutch $v$ and wheel $y$ being released, and the third by throwing in both clutches $v$ and $w$ and freeing both wheels $x$ and $y$. The reverse is obtained by throwing in clutch $v$ and releasing both wheels $x$ and $y$ and at the same time throwing in a train of pinions 20 21 22 between wheel $x$ and the external teeth of wheel $y$, as hereinafter described. When both clutches are out, the gear runs free. The clutch-rings $v$ and $w$ are of the form shown in Fig. 4—that is, of approximately circular form with or without a central loop. A wedge 8 is introduced between the adjacent portions of the two segments, and by means of a screw or bolt 9 the wedge may be set so as to adjust the rings initially and at any time afterward to allow for wear. The clutch-rings are expanded by means of eccentric-pins 10, against which the ends abut. The pins 10 are partially rotated by levers or arms 11, which have rollers 12 on their ends adapted to be engaged and thrust apart by sliding tapered or wedge-shaped collars 13. The collars 13 are operated by pivoted forked levers 14, linked to bell-crank levers 15, which are jointed to rods or bars 16 17, adapted to be thrust rearward by a pedal to release the clutches and to be pulled forward by springs 18 19 to expand or throw in the clutches. The pedal 18 operates a lever 23, which abuts against the ends of the bars 16 17. The depression of the pedal, therefore, thrusts the bars rearward to release the clutches, while when the pedal is released the springs 18 19 pull the bars forward. To expand or throw in the clutches in the expanded or engaged condition and at the same time to lock either of the wheels $x$ and $y$, according to the speed required, the following devices are employed:

A pivoted quadrant 24 is provided with two sets of teeth, one set on one side (indicated by I, R, and F) and another on the opposite side and opposite end of the quadrant, (indicated by II and F,) there being a space III between the latter. The quadrant is arranged to oscillate between the bars 16 17 and may be brought to various positions to enable the teeth to move in recesses 25 therein and engage the bars to retain them against the action of the springs 18 19. The quadrant is connected by a link 26 to a rocking lever 27, rocked by a rod or chain 28, which is operated in turn by a hand-lever 29, conveniently arranged for the driver and adapted to be moved over an index indicating the necessary positions for the handle for the speed required. The rocking lever 27 is mounted on a shaft 30, carrying a pair of locking-pawls 31 32, which are brought into engagement with the wheels $x$ and $y$ when they are required to be locked, the oscillations of the locking-pawls being simultaneous with those of the quadrant 24. A second or reversing-handle 33 operates by a rod or chain 34 another rocking lever 35, which oscillates cams 36 or small cranks working in slots 37 in pivoted plates 38, carrying the train of gears 20 21 22. By suitable manipulation of the reversing-handle 33 the plates 38 are oscillated to bring the train into gear with the wheels $x$ and $y$ when a reverse is required.

In order that the above-described gear may be understood, the operations required for changing speeds will be described. To obtain the first speed ahead, the pedal is depressed and the handle 29 is moved to the point on the index showing first speed. This brings the quadrant 24 to a position wherein the tooth I is in the recess 25 of the bar 17, while all other teeth are clear of the bar 16. At the same time the pawl 31 is brought into engagement with the wheel $y$. The pedal is then released, when the bar 16 will be pulled forward by its spring to apply the clutch $v$; but the bar 17 will be retained, so as to keep the clutch $w$ out. The second speed is similarly obtained by depressing the pedal and moving the handle 29 to bring the tooth II on the quadrant to hold back the bar 16, in which case the bar 17 is free to move under the action of its spring, and at the same time the pawl 32 is oscillated to lock the wheel $x$, while the pawl 21 frees the wheel $y$. The third speed is obtained by depressing the pedal and manipulating the handle 29 to bring the quadrant to a position wherein both bars are free to move forward under the action of the springs, the bar 16 sliding through the space III and the bar 17 being quite clear of teeth. In this position of the quadrant both pawls 32 and 31 are disengaged from the wheels $x$ and $y$. The reverse is obtained by depressing the pedal and moving the handle 29 to a position indicated on the index, whereby the quadrant 24 is oscillated to bring the tooth R in the recess 25 of the bar 17, the bar 16 being clear of teeth. At the same time the pawls are out of engagement; but the reversing-handle 33 is moved to bring the train 20 to 22 into gear with the wheels $x$ $y$.

To enable the gear to run free, the pedal is depressed and the handle 29 is moved to a position suitably indicated on the index whereby the quadrant 24 brings the two teeth F F into positions to retain both bars 16 17, whereby both clutches are out of engagement, the handle 33 being also moved to disengage the train of gear 20 to 22. (See Fig. 2.)

It is obvious that the driver can pass to any gear he wishes without coming through the intermediate gears. It is also obvious that this method of gear changing is not confined to chain-driven cars, but can be applied equally well to those driven by "propeller-shaft."

The whole gear, including the sprocket-pinion $s$ and chain $t$ is inclosed in an oil-tight case $d$. The forward end $c$ of the case is a casting. It is split and has a tightening-bolt $e$ for causing the split end $c$ to clamp or release a bush $f$, which is internally threaded to receive the end proper, $g$, of the gear-case, this end being in two parts screwed or bolted together, so that it can be placed around the engine-crank shaft $h$ or a secondary shaft parallel therewith. The bush $f$ is always free to oscillate on the end $s$ to permit the back axle to accommodate itself to inequalities of the road. The rear end of the case $d$ is also made in two parts $i$ $k$, bolted or screwed together, it being provided with glands for the driving-axle.

Instead of a chain it is obvious that the drive may be effected by means of gear-wheels.

Having thus described our invention, what we claim as new, and desire to secure by Letters Patent, is—

1. A change-gear for automobiles comprising a freely-mounted driver, a single set of epicyclic gears consisting of a sun-pinion, planet-pinions and an annular wheel, the sun-pinion and the annular wheel also being freely mounted, clutches for connecting them to the driver, means for locking them and means for operating said clutches and locking means, substantially as and for the purpose hereinbefore set forth.

2. A change-speed gear for automobiles comprising a freely-mounted driver, a set of epicyclic gears consisting of a freely-mounted sun-pinion, planet-pinions and a freely-mounted annular wheel, a carrier for the planet-pinions, a balance-gear having a planet-pinion, said pinion being carried by the carrier, means for connecting the sun-wheel and annular wheel to the driver and means for locking them, substantially as and for the purpose hereinbefore set forth.

3. A change-speed gear for automobiles, comprising a freely-mounted driver, a set of epicyclic gears consisting of a freely-mounted sun-pinion and annular wheel and planet-pinions, a carrier for the planet-pinions, a driven axle to which said carrier is operatively connected, two spur-wheels respectively rigid with the sun-pinion and the annular wheel, clutches for connecting said spur-wheels with the driver, pawls adapted to lock said wheels, and means for operating said clutches and pawls, substantially as hereinbefore described and set forth.

4. A change-speed gear for automobiles, comprising a freely-mounted driver, a set of epicyclic gears consisting of a freely-mounted sun-pinion and annular wheel and planet-pinions, a carrier for said planet-pinions, a driven axle to which said carrier is operatively connected, two spur-wheels respectively rigid with the sun-pinion and the annular wheel, clutches for connecting said spur-wheels with the driver, pawls adapted to lock said wheels, a reversing-train adapted to operatively connect said spur-wheels, and means for operating said clutches, pawls and reversing-train, substantially as hereinbefore described and set forth.

5. A change-speed gear for automobiles, comprising a freely-mounted driver, a set of epicyclic gears consisting of a freely-mounted sun-pinion and annular wheel and planet-pinions, a carrier for said planet-pinions, a driven axle to which said carrier is operatively connected, two spur-wheels respectively rigid with the sun-pinion and the annular wheel, clutches for connecting said spur-wheels with the driver, pawls adapted to lock said wheels means for operating said clutches and pawls the means for operating the clutches comprising levers and sliding collars, pivoted clutch-forks therefor, draw-bars, links and levers connecting said forks to the draw-bars, a pedal for thrusting said bars in one direction to release the clutches and springs for returning said bars to engage the clutches.

6. A change-speed gear for automobiles, comprising a freely-mounted driver a set of epicyclic gears, consisting of a freely-mounted sun-pinion and annular wheel and planet-pinions, a carrier for said planet-pinions, a driven axle to which said carrier is operatively connected, two spur-wheels respectively rigid with the sun-pinion and the annular wheel, clutches for connecting said spur-wheels with the driver, pawls adapted to lock said wheels means for operating said clutches and pawls, the means for operating the clutches comprising levers, and sliding collars, pivoted clutch-forks therefor, draw-bars, links and levers connecting said forks to the draw-bars, a pedal for thrusting said bars in one direction to release the clutches, springs for returning said bars to engage the clutches and means for operating the pawls comprising the pawl-shaft, a rocking lever and a draw-rod, substantially as hereinbefore described and set forth.

7. A change-speed gear for automobiles comprising a freely-mounted driver, a set of epicyclic gears consisting of a freely-mounted sun-pinion and annular wheel and planet-pinions, a carrier for the planet-pinions, a driven axle to which the carrier is operatively connected, two spur-wheels respectively rigid with the sun-pinion, and the annular wheel, clutches for connecting said spur-wheels with the driver, pawls adapted to lock said wheels, means for operating said clutches and pawls, the means for operating the clutches comprising levers and sliding collars, pivoted clutch-forks therefor, draw-bars links and levers connecting said forks to the draw-bars, a pedal for thrusting said bars in one direction to release the clutches, springs for returning said bars to engage the clutches and the means for operating the pawls comprising the pawl-shaft, a rocking lever and a draw-rod and means for selecting and detaining the draw-bars of the clutch-operating mechanism against the action of their springs, substantially as hereinbefore described and set forth.

8. A change-speed gear for automobiles, comprising a freely-mounted driver, a set of epicyclic gears consisting of a freely-mounted sun-pinion, and annular wheel and planet-pinions, a carrier for the planet-pinions, a driven axle with which the carrier is operatively connected, two spur-wheels respectively rigid with the sun-pinion and the annular wheel, clutches for connecting said spur-wheels with the driver, pawls adapted to lock said wheels, means for operating said clutches and pawls, the means for operating the clutches, comprising levers and sliding collars, pivoted clutch-forks therefor, draw-bars, links and levers, connecting said forks to the draw-bars, a pedal for thrusting said bars in one direction to release the clutches, springs for returning said bars to engage the clutches and means for operating the pawls comprising a pawl-shaft, a rocking lever and a draw-rod and means for selecting and detaining the draw-bars of the clutch-operating mechanism against the action of their springs comprising a pivoted toothed quadrant linked to the locking-pawl rocking lever, and notches in the draw-bars, adapted to receive the teeth on the quadrant, substantially as hereinbefore described and set forth.

9. A change-gear for automobiles comprising a freely-mounted driver, a single set of epicyclic gears consisting of a sun-pinion, planet-pinions and an annular wheel, the sun-pinion and the annular wheel also being freely mounted, clutches for connecting them to the driver, means for locking them and means for operating said clutches and locking means, a case for inclosing the gear the forward end of which is split a clamping-bolt fitted on said end, a rotatable gland in said end, a casting screwed into said gland, the casting being in halves to embrace the motor-shaft and driving sprocket-pinion thereon, substantially as hereinbefore described and set forth.

10. A change-speed gear for automobiles, comprising a freely-mounted driver, a set of epicyclic gears consisting of a freely-mounted sun-pinion and annular wheel and planet-pinion, a carrier for said planet-pinion, a driven axle with which the carrier is operatively connected, two spur-wheels respectively rigid with the sun-pinion and the annular wheel, clutches for connecting said spur-wheels with the driver, pawls adapted to lock said wheels, a reversing-train adapted to operatively connect said spur-wheels, pivoted plates carrying said train a crank for rocking said plates, and a draw-rod therefor, substantially as hereinbefore described and set forth.

11. A change-speed gear for automobiles, comprising a freely-mounted driver, a set of epicyclic gears consisting of a freely-mounted sun-pinion and annular wheel and planet-pinions, a carrier for said planet-pinions, a driven axle with which the carrier is operatively connected, two spur-wheels, respectively rigid with the sun-pinion and the annular wheel, clutches for connecting said spur-wheels with the driver, pawls adapted to lock said wheels, a reversing-train adapted to operatively connect said spur-wheels, and means for operating said clutches, pawls and reversing-train, a pedal for controlling the clutch-operating means and two handles for controlling the means for operating the locking-pawls, substantially as hereinbefore described and set forth.

In witness whereof we have signed our names to this specification in the presence of two subscribing witnesses.

JOHN HENRY CHAMBERS.
ROBERT MARTIN CHAMBERS.
CHARLES EDWARD CHAMBERS.

Witnesses to the signature of the said John Henry Chambers:
ALBERT E. PARKER,
BERTRAM J. HOLLAND.

Witnesses to the signatures of the said Robert Martin Chambers and Charles Edward Chambers:
ROBT. JAS. ROBB,
A. M. PATTON.